Patented Mar. 12, 1935

1,993,737

UNITED STATES PATENT OFFICE 1,993,737

DECYL ESTERS OF POLYCARBOXYLIC ACIDS

George De Witt Graves, Wilmington, Del., and Walter Eastby Lawson, Woodbury, N. J., assignors to E. I. du Pont de Nemours & Company, Wilmington, Del., a corporation of Delaware No Drawing. Application June 20, 1934, Serial No. 731,460

10 Claims. (Cl. 260—103)

This invention relates to new compositions of matter, particularly to esters of n-decyl alcohol, and still more particularly to the polycarboxylic acid esters of n-decyl alcohol. This case is a continuation in part of copending applications Serial Nos. 543,386 and 543,387, filed June 10, 1931, and 646,298, filed December 8, 1932, which last two applications have resulted in U. S. Patents 1,972,091 and 1,972,092, respectively.

This invention has as an object the provision of processes for the preparation of polycarboxylic acid esters of n-decyl alcohol. A further object is the new class of esters thus prepared. Other objects will appear hereinafter.

These objects are accomplished by the following invention wherein a polycarboxylic acid ester of n-decyl alcohol is prepared by the reaction of decyl alcohol with a polycarboxylic acid or an anhydride, chloride, or ester thereof, or by equivalent processes.

Polycarboxylic acid esters of n-decyl alcohol may be prepared by reacting under appropriate conditions n-decyl alcohol with a polycarboxylic acid or the anhydride, chloride, or ester thereof, or by reacting the sodium salt of the polycarboxylic acid with a n-decyl halide.

In carrying out the processes of the present invention pure decyl alcohol may be used, or the commercial form, which is obtained as byproduct in the utilization of alcohols obtained by the carboxyl hydrogenation of coconut oil. Any polycarboxylic acid may be used, including aliphatic dicarboxylic acids such as succinic, adipic, sebacic, maleic; aromatic carboxyli acids such as phthalic, terephthalic, trimesic; substituted-polycarboxylic acids such as tartaric, citric, nitrophthalic, diglycollic; heterocyclic acids such as quinolinic; alicyclic acids such as hexahydrophthalic; etc.

Having outlined above the general purposes and extent of the invention, the following applications of the general principle thereof to certain specific instances are included for purposes of illustration and not in limitation.

Example 1

*Didecyl phthalate.*—A mixture containing 300 g. phthalic anhydride, 700 g. decyl alcohol, 600 g. ethylene dichloride, and 5½ g. of sulfuric acid was heated to boiling in an apparatus designed to separate the water from the distillate and to return ethylene dichloride to the reaction vessel. Distillation was continued until the theoretical amount of water had been removed and substantially all the organic acid had been esterified. The resulting product was washed with sodium carbonate solution to remove the acid and then with water. The product was refined by heating to 150° C. under 50 mm. vacuum to remove the majority of the volatile material. The product was then steamed under the same conditions to remove all traces of volatile material. The resulting product was decolorized with activated carbon and filtered. Didecyl phthalate is a water-white, oily liquid of extremely high boiling point.

Example 2

*Didecyl succinate.*—A mixture containing 236 g. pure succinic acid, 660 g. decyl alcohol, 600 g. ethylene dichloride, and 4 g. sulfuric acid was heated to boiling in the apparatus described in Example 1. The product was purified and refined as in Example 1. Pure didecyl succinate is a white crystalline solid melting above room temperature.

Example 3

*Didecyl adipate.*—A mixture containing 174 g. methyl adipate, 360 g. decyl alcohol, 200 g. toluol, and 10 g. litharge was heated to boiling under a good fractionating column until the theoretical amount of toluol-methanol binary had been removed. The product was filtered to remove the litharge and refined as described in Example 1. Didecyl adipate is a water-white, oily liquid.

In addition to the simple esters above described mixed esters wherein the acid hydrogen is replaced by a decyl radical and the other by a radical of another monohydric alcohol such as the straight chain aliphatic alcohols from methanol to stearyl alcohol; aromatic alcohols such as benzyl alcohol; alicyclic alcohols such as cyclohexanol; heterocyclic alcohols such as tetrahydrofurfuryl alcohol; ether alcohols such as diethylin, ethoxyethanol, and methoxyethanol; etc. These may be made by reacting decyl alcohol with an acid ester of the other alcohol, or in the case of more volatile alcohols, by reacting one molecular weight of the neutral ester of the volatile alcohol with one molecular weight of decyl alcohol. The acid decyl esters may also be made by reacting one molecular weight of the acid or its anhydride with one molecular weight of normal decyl alcohol or, by ester interchange of the neutral ester with an equimolecular quantity of the acid.

Any of the acids mentioned above may be substituted for the succinic acid or phthalic anhydride of Examples 1 and 2, or the methyl or other lower esters of any of the above acids may be substituted for the methyl adipate of Example 3. In addition the acid chloride of any of the above acids may be used. Other catalysts than sulfuric may be used to assist in removing the ester in Examples 1 and 2, and other catalysts than litharge may be used in Example 3. Solvents other than those mentioned may be used in either case. All of the esters prepared in the manner above described are substantially nonvolatile and have been found to be satisfactory plasticizers for cellulose derivatives and natural and synthetic resins. They are readily soluble in ordinary organic solvents and are miscible with other materials commonly used as plasticizers.

These esters may be used as plasticizers with cellulose derivatives such as ethyl cellulose, nitrocellulose, and the like, in the manufacture of coating or plastic compositions. Natural and synthetic resins, oils, waxes, such as paraffin wax, solvents, pigments, and organic fillers may be used as desired. The plasticizer may be replaced in part by one or more of the plasticizers known to the art.

The methods for the preparation of the compounds above described are capable of considerable variation, and the invention is not limited to the specific method described.

The esters of the present invention may be used for the preparation of plasticized compositions or as high boiling liquids for heat interchange or as lubricants. Because of their extremely high boiling point and water resistance they are suitable for uses where many of the more common esters are unsatisfactory. Because of the tasteless, odorless, and nontoxic nature of many of these esters they are of use in many applications calling for these properties.

The esters of the present invention may be described by the following formula:

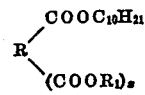

in which R represents a polyvalent radical, either aliphatic, aromatic, heterocyclic, alicyclic, or a substituted radical of these classes; $R_1$ represents a radical derived from an alcohol and may be n-decyl, and $x$ is one or more.

The above description and examples are intended to be illustrative only. Any modification of or variation therefrom which conforms to the spirit of the invention is intended to be included within the scope of the claims.

We claim:

1. A composition comprising as a dominant component a normal decyl ester of a polycarboxylic acid.
2. An ester of a polycarboxylic acid in which at least one acid hydrogen has been replaced by a normal decyl radical.
3. A neutral ester of a polycarboxylic acid in which at least one acid hydrogen has been replaced by a normal decyl radical.
4. A neutral ester of a polycarboxylic acid in which each of the acid hydrogen atoms has been replaced by a normal decyl radical.
5. An ester of a dicarboxylic acid in which at least one acid hydrogen has been replaced by a normal decyl radical.
6. An ester of a dicarboxylic acid in which each acid hydrogen atom has been replaced by a normal decyl radical.
7. A normal decyl ester of phthalic acid.
8. Neutral normal decyl phthalate.
9. A normal decyl ester of succinic acid.
10. Neutral normal decyl succinate.

GEORGE DE WITT GRAVES.
WALTER EASTBY LAWSON.